United States Patent
Szabo et al.

(10) Patent No.: US 10,492,246 B2
(45) Date of Patent: Nov. 26, 2019

(54) METHOD AND COMMUNICATIONS SYSTEM FOR SPEECH COMMUNICATION

(71) Applicant: FREQUENTIS AG, Vienna (AT)

(72) Inventors: Ernst Szabo, Vienna (AT); Bernhard Haindl, Schoenberg (AT); Gerald Mohnl, Zwentendorf (AT)

(73) Assignee: Frequentis AG, Vienna (AT)

( * ) Notice: Subject to any disclaimer, the term of this patent is extended or adjusted under 35 U.S.C. 154(b) by 0 days.

(21) Appl. No.: 16/177,982

(22) Filed: Nov. 1, 2018

(65) Prior Publication Data

US 2019/0075615 A1 Mar. 7, 2019

Related U.S. Application Data

(63) Continuation of application No. 15/554,140, filed as application No. PCT/AT2016/050031 on Feb. 18, 2016, now Pat. No. 10,154,538.

(30) Foreign Application Priority Data

Feb. 27, 2015 (AT) .............................. A 50158/2015

(51) Int. Cl.
*H04W 76/45* (2018.01)
*H04L 29/06* (2006.01)
(Continued)

(52) U.S. Cl.
CPC .......... *H04W 76/45* (2018.02); *G08G 5/0026* (2013.01); *G08G 5/0095* (2013.01);
(Continued)

(58) Field of Classification Search
CPC ....... H04W 4/10; H04W 76/45; H04W 84/08; H04W 4/08; H04W 76/10; H04W 4/16; H04W 68/00; H04W 68/005; H04W 76/00

See application file for complete search history.

(56) References Cited

U.S. PATENT DOCUMENTS

| 5,365,590 | A | 11/1994 | Brame |
| 8,355,691 | B2 * | 1/2013 | Roy ..................... H04L 12/1818 455/404.1 |
| 8,831,663 | B2 | 9/2014 | Fumarolo et al. |

FOREIGN PATENT DOCUMENTS

| DE | 19752651 A1 | 6/1998 |
| EP | 1460870 A2 | 9/2004 |
| EP | 2767451 A2 | 8/2014 |

* cited by examiner

*Primary Examiner* — Keith Ferguson
(74) *Attorney, Agent, or Firm* — Laurence A. Greenberg; Werner H. Stemer; Ralph E. Locher

(57) ABSTRACT

A method and a communications system for speech communication includes a plurality of workstations and a plurality of radio transmission devices and radio receiving devices. There are control units in the signal path between the workstations and the radio transmission devices and the radio receiving devices. The control units select the speech signals of one of the workstations according to predetermined or predeterminable criteria when there is a simultaneous plurality of operating signals of a plurality of workstations, or overlap the speech signals of a plurality of workstations according to predefined criteria, and transmit the speech signal thus obtained, chosen or overlapped for sending on the radio transmission device. Further, the control units transmit a receiving signal to the workstations connected thereto when the speech signals transmitted from the radio receiving unit are present, and transfer the speech signals to said workstations.

20 Claims, 6 Drawing Sheets

(51) Int. Cl.
  *H04W 4/10* (2009.01)
  *G08G 5/00* (2006.01)
  *H04W 84/08* (2009.01)
(52) U.S. Cl.
  CPC ........... *H04L 65/4061* (2013.01); *H04W 4/10* (2013.01); *H04M 2250/74* (2013.01); *H04W 84/08* (2013.01)

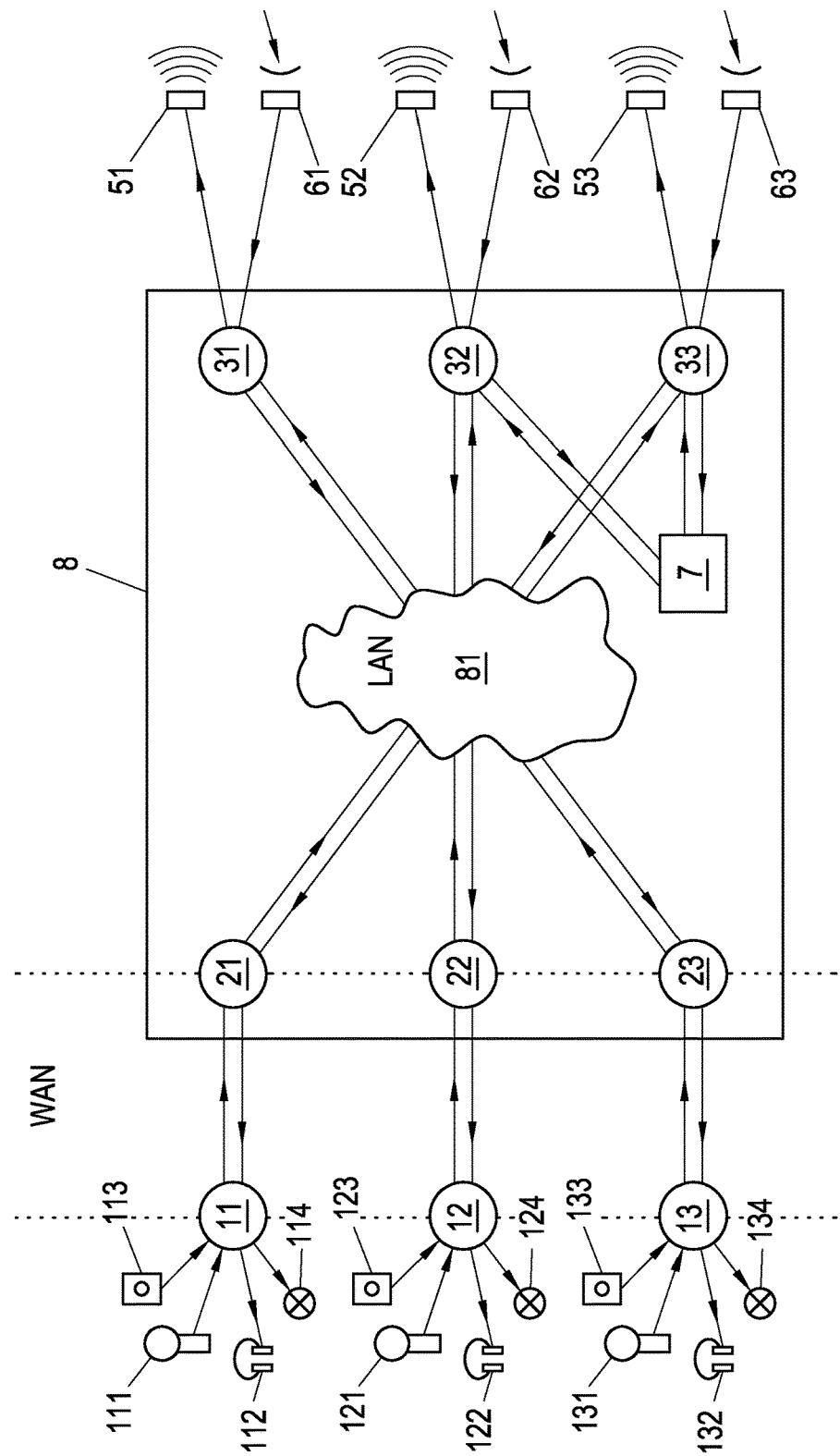

METHOD AND COMMUNICATIONS SYSTEM FOR SPEECH COMMUNICATION

CROSS-REFERENCE TO RELATED APPLICATION

This application is a continuation of patent application Ser. No. 15/554,140, filed Aug. 28, 2017; which was a § 371 national stage filing of international application No. PCT/AT2016/050031, filed Feb. 18, 2016, which designated the United States; this application also claims the priority, under 35 U.S.C. § 119, of Austrian patent application No. A 50158/2015, filed Feb. 27, 2015; the prior applications are herewith incorporated by reference in their entirety.

BACKGROUND OF THE INVENTION

Field of the Invention

The invention relates to a communication system for voice communication and to a method for a voice communication. Such a communication system essentially has provision for voice signals and signaling information PTT/SQU to be able to be transferred from one or more workstations to one or more radio devices and vice versa.

In air traffic control, the size of the communication system and also the geographical distribution of the individual components required may be very different. Small systems, for example tower systems, can consist of a few workstations and a few radio transmission devices and radio reception devices, which are sometimes even accommodated in the same building. Large systems, for example air traffic control centers, can consist of many hundreds of workstations and correspondingly large numbers of radio transmission devices and radio reception devices at geographically distributed sites, any workstation being able to communicate with any radio device, depending on the configuration of the communication system.

For radio operation, the air traffic controller at the workstation can select the frequencies required for operation thereof that he wishes to talk on in TX mode and/or listen in on in RX mode. For the transmission of voice signals, an operator control unit 113, 123, 133 is operated, in particular a PTT button is pushed, whereupon not only the voice signals picked up at the workstation but also a PTT signal is transferred to a radio transmission device 51, 52, 53. On the basis of the PTT signal, the RF transmission with the voice signal modulated on is performed at the radio transmission device 51, 52, 53. When a radio reception device 61, 62, 63 receives an RF signal, the demodulated voice signal is transferred together with a received signal SQU to the workstations 11, 12, 13. Voice signals that are received on a frequency selected by the workstation are output on the loudspeaker or in a headset at this workstation 11, 12, 13, and the associated received signal SQU is displayed on the workstation, e.g. on the graphical user interface.

Additionally, an air traffic controller can couple at least two or more frequencies to one another, in which case all audio signals that are received by a radio reception device 61, 62, 63 associated with one of the coupled frequencies are transmitted to the radio transmission devices 51, 52, 53 having the other frequencies. Which frequencies an air traffic controller can actually select is dependent on the configuration of the workstation 11, 12, 13, this configuration also being able to be swapped.

An example of a communication system that is known from the prior art is depicted in more detail in FIG. 1. A standard radio workstation 11, 12, 13 known from the prior art can have an electronic unit or a PC equipped with a touch panel for operator control, a microphone 111, 121, 131, an operator control unit 113, 123, 133 for triggering the PTT signal, a headset 112, 122, 132 and an optional loudspeaker. Insofar as a radio device is under discussion generally, it is understood to mean a radio transmission device or a radio reception device or a combined radio transmission and radio reception device.

If each workstation 11, 12, 13 uses a radio transmission device or a radio reception device to set up a direct communication link, the radio transmission device 51, 52, 53 performs the arbitration for the voice signal to be transmitted and the radio reception device 61, 62, 63 distributes the received voice signals to those workstations 11, 12, 13 that have keyed in this frequency. Every signal transfer between a workstation 11, 12, 13 and a radio device respectively comprises a voice signal and an associated piece of signaling information PTT or SQU that is transferred at the same time as the voice signal. For a signal transfer from a workstation 11, 12, 13 to a radio transmission device, the presence of the voice signal is signaled by an operator control signal PTT. The signal transfer between the radio reception device 61, 62, 63 and a workstation 11, 12, 13 also comprises a received signal SQU after the voice signal.

An example of possible communication links between workstations 11, 12, 13 and radio transmission device 51, 52, 53 or radio reception device 61, 62, 63 is depicted in FIG. 1, each workstation 11, 12, 13 being able to be allocated any number of radio transmission devices 51, 52, 53 and radio reception devices 61, 62, 63 according to its operational configuration. In the extreme case, this results in an m:n communication links between m workstations 11, 12, 13 and n radio transmission devices 51, 52, 53 or radio reception devices 61, 62, 63. This results in the problem that when a workstation 11, 12, 13 transmits a voice signal to n radio transmission devices 51, 52, 53 simultaneously, n audio streams need to be transmitted by the workstation. As a result, the necessary bandwidth for each individual workstation 11, 12, 13 is dependent on to how many radio transmission devices the voice signal of the workstation is transferred simultaneously in the case of a radio transmission, or how many radio reception devices are listened in on simultaneously by this workstation. For a radio transmission device, on the other hand, the problem arises that in the event of a simultaneous transmission from multiple workstations, a multiplicity of voice signals need to be transferred to the radio transmission device, one of which is selected for the actual transmission. In the reception direction, radio reception devices need to transfer a voice signal to the workstation for each workstation that listens in on this radio reception device. The necessary bandwidth for each radio device is therefore dependent on how many workstations 11, 12, 13 simultaneously send a voice signal to a radio transmission device 51, 52, 53 or how many workstations 11, 12, 13 simultaneously listen in on the received audio signal of this radio reception device 61, 62, 63.

In modern radio communication systems, the communication links between the workstations 11, 12, 13 and the radio devices 51, 52, 53, 61, 62, 63 are set up for local applications not directly but rather in a communication system, and the workstations 11, 12, 13 or the radio devices 51, 52, 53, 61, 62, 63 are linked directly to the communication system.

SUMMARY OF THE INVENTION

It is an aim of the invention for any air traffic controller, regardless of the geographical location of the air traffic control center and hence his workstation, to be able to access any radio frequency, whatever the geographical location thereof. In particular, it is an aim of the invention for multiple air traffic control centers to be combined to form one large virtual control center, or for one control center to be able to undertake the tasks of another without the overall structure of the communication system needing to be changed in the process. At the same time, the required data rates for transfer of the voice signals via the necessary networks are intended to be optimized.

The invention overcomes the aforementioned problems in a communication system of the type cited at the outset having the characterizing features as claimed.

In achieving this object, the invention can use via wide area networks WAN for the transfer of voice and signaling information, these data networks being dimensioned such that the required freedom from blockage and the necessary quality of the voice transfer are ensured in all operating states of the communication system.

Further, the invention has the aim of providing an improved system architecture that matches the necessary bandwidth and the quality demands on transfer to the available network and on the type of application, particularly for tower, remote tower, ACC or virtual ACC applications.

At the same time, the hardware demands on the workstations 11, 12, 13 should be reduced and it should be possible for the components of the communication system to be physically concentrated in computer centers 8, the dynamic distribution of audio signals being concentrated between the workstations 11, 12, 13 and the radio devices 51, 52, 53, 61, 62, 63 in one or more local area networks in accordance with the m:n communication matrix. The bandwidth requirement in the interposed wide area networks WAN is intended to be decreased as far as possible.

For all components of the communication system that are able to be displaced over a network, the bandwidth requirement should be deterministic, minimized and static and/or constant. This can be achieved if each component always sends a defined number of voice signals via the network and the distribution of these voice signals between the components in the local area network takes place in a computer center 8.

These properties can be used to realize specifically a virtual ACC application, wherein workstations 11, 12, 13, computer centers 8, control units and radio devices are operated in a manner geographically distributed at different locations and all workstations, regardless of their geographical location, can access all radio devices that can be reached via a network. In this case, the necessary data rate in the network is minimized and is deterministic and independent of how many radio transmission devices or radio reception devices a workstation talks to or listens in on simultaneously or how many workstations talk to a radio transmission device simultaneously or how many workstations listen in on a radio reception device.

Usually, the bandwidth of the network connections to the individual radio devices is limited, which means that it is not possible to transfer any amount of audio signals to a radio device and hence have the radio transmission device make the selection of the voice signal to be transmitted. Furthermore, radio devices are often only capable of transferring or receiving one or a few voice signal(s).

In the reception direction, it is likewise not possible for a radio reception device to simultaneously transfer the received voice signal to any amount of workstations that wish to listen in on the same frequency.

The invention overcomes the aforementioned problems and disadvantages in a communication of the type cited at the outset having the characterizing features as claimed.

In a communication system for voice communication by means of a number of workstations, particularly for air traffic controllers, and also a number of radio transmission devices and radio reception devices, wherein each of the workstations respectively has at least the following:

at least one voice input unit, particularly a microphone, at least one voice output unit, particularly a loudspeaker or headphones, at least one operator control unit for producing an operator control signal that indicates that voice signals are intended to be transferred from the respective workstation to one of the radio transmission devices by means of a voice input unit, at least one display unit for display of a received signal that indicates whether voice signals from one of the radio reception devices are output on the voice output unit, and at least one selection unit for selection of the radio transmission devices and radio reception devices that the workstations use to set up a voice connection on the basis of control signals, wherein the radio transmission devices are supplied with the voice signals produced by the voice input units and the operator control signals produced by the operator control units, and the radio transmission device is designed for delivery of the voice signals transferred by a workstation during simultaneous transmission of an operator control signal by means of radio, and wherein the radio reception devices are designed for reception of voice signals by means of radio, the voice signals received by the radio reception devices are supplied to the individual workstations for delivery by the voice output units, and the radio reception devices respectively transmit a received signal to the workstations during the reception of voice signals and forwarding thereof, there is provision that a number of control units is provided in the signal path between the workstations and the radio transmission devices and between the workstations and the radio reception devices, wherein each control unit has a communicative connection to and is associated with at least one radio transmission device and at least one radio reception device, wherein the radio transmission devices and radio reception devices associated with the same control unit preferably use the same radio frequency, and wherein particularly each radio transmission device and radio reception device is preferably associated only with a single control unit, that multiple workstations are connected to the same control unit, particularly all workstations are connected to all control units, that the control units, given the simultaneous presence of a multiplicity of operator control signals of multiple distribution units, select the voice signals of one of the distribution units according to prescribed or prescribable criteria or overlay the voice signals of multiple workstations according to prescribed criteria and transfer the selected or overlaid voice signal thus obtained for sending to the radio transmission device, and that the control units, given the presence of a voice signal transmitted by the radio reception device, transmit a received signal to the workstations connected to them and transfer the voice signals to these workstations.

This achieves particularly a simple transfer of data to the radio devices at a deterministic data rate. Furthermore, there is no longer any need for radio devices to arbitrate the voice radio data supplied to it.

Advantageous linking of multiple radio transmission devices or radio reception devices to a single control unit can be achieved by virtue of at least one control unit being connected to a plurality of radio transmission devices, the control unit transmitting the voice signals arriving at it from a workstation only to one of the radio transmission devices or to all radio transmission devices having a connection to it for transfer, and/or the control unit transmitting the voice signals that arrive at it from the radio reception devices to the workstations having a voice connection to it.

In order to achieve improved failsafety of radio devices, there may be provision that the control unit is connected to at least one radio transmission device and at least one backup radio transmission device and that the control unit transfers the voice signals to the radio transmission device when the latter is functioning and otherwise transfers the voice signals to the backup radio transmission device, and/or that the control unit is connected to at least one radio reception device and at least one backup radio reception device and that the control unit distributes the voice signals arriving at it from the radio reception device to the workstations when the radio reception device connected to said control unit is functioning and otherwise distributes the voice signals arriving at it from the backup radio reception device to the workstations. This failsafety is the same for each workstation.

Improved integration of multiple computer centers that use shared radio devices can be achieved in that the signal path between a control unit and the radio transmission device contains at least one superordinate control unit, the superordinate control unit is connected to a number of control units, wherein particularly each of these control units is connected to groups of workstations, the superordinate control unit is supplied with the voice signals and operator control signals delivered by the control units, wherein the superordinate control unit, given simultaneous delivery of operator control signals of multiple control units connected to it, selects one of the control units according to prescribed or prescribable criteria and forwards the voice signals of the selected control unit to the radio transmission device, and the superordinate control unit, on reception of voice signals from the radio reception device, forwards these voice signals to the control units connected to the superordinate control unit and transfers a received signal to these control units.

The forwarding of radio data exclusively at the request of the workstations can be achieved in that the control units or the superordinate control units transmit the voice signals arriving at them and the respectively associated received signals merely to a selection of workstations or control units, wherein preferably the control units or the superordinate control units make this selection on the basis of previously made demands by the workstations or the control units.

So as, when there are a multiplicity of different radio transmission devices connected to the same control unit, to leave the selection of the radio transmission device that is listened in on to the respective air traffic controller, there may be provision that the control units or superordinate control units directly connected to the radio reception devices are respectively connected to a plurality of radio reception devices having the same frequency and rate the voice signals simultaneously arriving at them from the radio reception devices and produce a rating signal, which indicates particularly a) a ranking of the arriving voice signals according to signal quality or b) the best of the arriving voice signals, and the control units or superordinate control units directly connected to the radio reception devices forward the rating signal and also the individual voice signals of all radio reception devices or the best voice signal to the workstations or the control units.

A simple and deterministic way of allowing shared coupling of multiple frequencies provides that a coupling unit is present that is connected to two or more control units and/or superordinate control units, wherein the coupling unit, on arrival of voice signals and of a received signal from a control unit or superordinate control unit connected to it, forwards these voice signals and also an operator control signal to the other control units and/or superordinate control units connected to it.

Arbitration can be performed using the coupling unit in that the coupling unit, on simultaneous arrival of voice signals from two control units or superordinate control units connected to it, selects one of the control units or superordinate control units according to prescribed or prescribable criteria and forwards only the voice signals of the selected control unit or superordinate control unit to the remaining control units or superordinate control units connected to the coupling unit.

In order to prevent sensitive information from protected areas from being rendered generally accessible, there may be provision that the coupling unit stores criteria for the forwarding of data of individual control units or superordinate control units to other control units or superordinate control units, and that the coupling unit transfers the voice signals arriving at it to the control units or superordinate control units connected to it according to these criteria.

In order to achieve simple transfer of voice signals between the workstations and the control units at a deterministic data rate, there may be provision that the communication system comprises a number of distribution units that are respectively associated with a workstation, wherein each workstation has at least one associated distribution unit, that between each of the distribution units and the workstation associated with this distribution unit there is respectively a logical or physical data connection having a prescribed bandwidth that can be used to transfer voice signals from each voice input unit and voice signals to each voice output unit of the workstation and also operator control signals and received signals, that the distribution unit confers or overlays the voice signals reaching it from radio reception devices, particularly by means of the control units, according to a rule prescribed on the basis of control signals and transmits the voice signals ascertained therefrom to the workstation or forwards the voice signals arriving from a selected radio reception device, particularly by means of one of the control units, to the workstation and, if there are actually voice signals present, forwards a received signal to the workstation, and that the distribution unit transmits, particularly by means of one of the control units, voice signals and operator control signals transmitted to it by the workstation to radio transmission devices previously selected by means of control signals.

A variant that is simple to realize in terms of network engineering and that avoids the transmission of large volumes of data over long distances provides that the distribution units are arranged as proxy computers in a computer center and the control units are also arranged in this computer center, wherein the control units and the distribution units are respectively connected to one another via a local area network.

In order to operate separate communication channels using one workstation, there may be provision that a workstation has multiple voice input units and/or multiple voice output units, wherein the communication system respectively has, for each voice input unit, a separate data connection to a distribution unit associated with the workstation, and wherein the communication system respectively has, for each voice output unit, a separate data connection to a distribution unit associated with the workstation.

So as, when there are a multiplicity of different radio transmission devices connected to the same control unit, to leave the selection of the radio transmission device that is listened in on to the respective air traffic controller and at the same time to keep down the volume of data needing to be transferred over a long distance, there may be provision that the control unit transmits the rating signal to the distribution unit, and the distribution unit takes the rating signal as a basis for selecting one of the voice signals transmitted by the respective control unit or takes the rating signal as a basis for overlaying multiple instances of the voice signals transmitted by the respective control unit on one another and transmits the selected or overlaid signal to the workstation.

Further, the invention relates to a communication system for voice communication by means of a number of workstations, particularly for air traffic controllers, and also a number of radio transmission devices and radio reception devices, wherein each of the workstations respectively has at least the following:

at least one voice input unit, particularly a microphone, at least one voice output unit, particularly a loudspeaker, at least one operator control unit for producing an operator control signal that indicates that voice signals are intended to be transferred from the respective workstation to one of the radio transmission devices by means of a voice input unit, at least one display unit for reception of a received signal that indicates whether voice signals from one of the radio reception devices are output on the voice output unit, and at least one selection unit for selection of the radio transmission devices and radio reception devices that the workstations use to set up a voice connection on the basis of control signals, wherein the radio transmission devices are supplied with the voice signals produced by the voice input units and the operator control signals produced by the operator control units, and the radio transmission device is designed for delivery of the voice signals transferred by a workstation during simultaneous transmission of an operator control signal by means of radio, and wherein the radio reception devices are designed for reception of voice signals by means of radio, the voice signals received by the radio reception devices are supplied to the individual workstations for delivery by the voice output units, and the radio reception devices respectively transmit a received signal to the workstations during the reception of voice signals and forwarding thereof. Said communication system has provision that it comprises a number of distribution units that are respectively associated with a workstation, wherein each workstation has at least one associated distribution unit, that between each of the distribution units and the workstation associated with this distribution unit there is respectively a logical or physical data connection having a prescribed bandwidth that can be used to transfer voice signals from each voice input unit and voice signals to each voice output unit of the workstation and also operator control signals and received signals, that the distribution unit confers or overlays the voice signals reaching it from radio reception devices, particularly by means of the control units, according to a rule prescribed on the basis of control signals and transmits the voice signals ascertained therefrom to the workstation or forwards the voice signals arriving from a selected radio reception device, particularly by means of one of the control units, to the workstation and, if there are actually voice signals present, forwards a received signal to the workstation, and that the distribution unit transmits, particularly by means of one of the control units, voice signals and operator control signals transmitted to it by the workstation to radio transmission devices previously selected by means of control signals. This achieves particularly a simple transfer of voice signals between the workstations and the control units with a deterministic bandwidth.

Furthermore, there may advantageously be provision that a number of control units is provided in the signal path between the distribution units and the radio transmission devices and between the workstations and the radio reception devices, wherein each control unit has a connection to and is associated with at least one radio transmission device and at least one radio reception device, wherein the radio transmission devices and radio reception devices associated with the same control unit preferably use the same radio frequency, and wherein particularly each radio transmission device and radio reception device is associated only with a single control unit, that multiple distribution units are connected to the same control unit, particularly all distribution units are connected to all control units, that the control units, given the simultaneous presence of a multiplicity of operator control signals of multiple distribution units, select the voice signals of one of the distribution units according to prescribed or prescribable criteria or overlay the voice signals of multiple workstations according to prescribed criteria and transfer the selected or overlaid voice signal thus obtained for sending to the radio transmission device, and that the control units, given the presence of a voice signal transmitted by the radio reception device, transmit a received signal to the distribution units connected to said radio reception device and transfer the voice signals to these distribution units. This achieves particularly a simple transfer of data to the radio devices at a deterministic data rate. Furthermore, there is no longer any need for radio devices to arbitrate the voice radio data supplied to it.

Advantageous linking of multiple radio transmission devices or radio reception devices to a single control unit can be achieved in that at least one control unit is connected to a plurality of radio transmission devices, the control unit transmits the voice signals arriving at it from a distribution unit only to one of the radio transmission devices or to all radio transmission devices having a connection to it for transfer, and the control unit transmits the voice signals arriving at it from the radio reception devices to the distribution units having a voice connection to it.

In order to achieve improved failsafety for radio devices, there may be provision that the control unit is connected to at least one radio transmission device and at least one backup radio transmission device and in that the control unit transfers the voice signals to the radio transmission device when the latter is functioning and otherwise transfers the voice signals to the backup radio transmission device, and/or that the control unit is connected to at least one backup radio reception device and in that the control unit distributes the voice signals arriving at it from the radio reception device to the distribution units when the radio reception device connected to said control unit is functioning and otherwise distributes the voice signals arriving at it from the backup radio reception device to the distribution units. This failsafety is identical for each workstation.

Improved integration of multiple computer centers that use shared radio devices can be achieved in that the signal path between a control unit and the radio transmission device contains at least one superordinate control unit, the superordinate control unit is connected to a number of control units, wherein particularly each of these control units is connected to groups of respectively different distribution units and workstations, the superordinate control unit is supplied with the voice signals and operator control signals delivered by the control units, wherein the superordinate control unit, given simultaneous delivery of operator control signals of multiple control units connected to it, selects one of the control units according to prescribed or prescribable criteria and forwards the voice signals of the selected control unit to the radio transmission device, and the superordinate control unit, on reception of voice signals form the radio reception device, forwards these voice signals to the control units connected to the superordinate control unit and transfers a received signal to these control units.

Forwarding of radio data exclusively at the request of the workstations can be achieved in that the control units or the superordinate control units transmit the voice signals arriving at them and the respectively associated received signal merely to a selection of distribution units or control units, wherein preferably the control units or the superordinate control units make this selection on the basis of previously made demands by the workstations or the control units.

So as, when there are a multiplicity of different radio transmission devices connected to the same control unit, to leave the selection of the radio transmission device that is listened in on to the respective air traffic controller, there may be provision that the control units or superordinate control units directly connected to the radio reception devices are respectively connected to a plurality of radio reception devices and rate the voice signals arriving at them from the radio reception devices and produce a rating signal, which indicates particularly:

a ranking of the arriving voice signals according to signal quality or the best of the arriving voice signals, and the control units or superordinate control units directly connected to the radio reception devices forward the rating signal and also the individual voice signals of all radio reception devices to the distribution unit or the control units.

So as, when there are a multiplicity of different radio transmission devices connected to the same control unit, to leave the selection of the radio transmission device that is listened in on to the respective air traffic controller and at the same time to keep down the volume of data to be transferred over a long distance, there may be provision that the control unit transmits the rating signal to the distribution unit, and the distribution unit takes the rating signal as a basis for selecting one of the voice signals transmitted by the respective control unit or takes the rating signal as a basis for overlaying multiple instances of the voice signals transmitted by the respective control unit on one another and transmits the selected or overlaid signal to the respective workstation connected to the distribution unit.

A simple and deterministic way of allowing shared coupling of multiple frequencies provides that a coupling unit is present that is connected to two or more control units and/or superordinate control units, wherein the coupling unit, on arrival of voice signals and of a received signal from a control unit or superordinate control unit connected to it, forwards these voice signals and also an operator control signal to the other control units and/or superordinate control units connected to it.

Arbitration can be performed using the coupling unit in that the coupling unit, on simultaneous reception of voice signals from two control units or superordinate control units connected to it, selects one of the control units or superordinate control units according to prescribed or prescribable criteria and forwards only the voice signals of the selected control unit or superordinate control unit to the remaining control units or superordinate control units connected to the coupling unit.

To prevent sensitive information from protected areas from being rendered generally accessible, there may be provision that the coupling unit stores criteria for the forwarding of data of individual control units or superordinate control units to other control units or superordinate control units, and the coupling unit transfers the voice signals arriving at it to the control units or superordinate control units connected to it according to these criteria.

A variant that is simple to realize in terms of network engineering and that avoids the transmission of large volumes of data over a long distance provides that the distribution units are arranged as proxy computers in the computer center and the control units are also arranged in this computer center, wherein the control units and the distribution units are respectively connected to one another via a local area network.

In order to operate separate communication channels using one workstation, there may be provision that a workstation has multiple voice input units and/or multiple voice output units, wherein the communication system respectively has, for each voice input unit, a separate data connection to a distribution unit associated with the workstation, and wherein the communication system respectively has, for each voice output unit, a separate data connection to a distribution unit associated with the workstation.

In a method for transferring voice data from a number of workstations, particularly for air traffic controllers, respectively comprising:

at least one voice input unit, particularly a microphone, at least one voice output unit, particularly a loudspeaker or headphones, at least one operator control unit for producing an operator control signal that indicates that voice signals are intended to be transferred from the respective workstation to one of the radio transmission devices by means of a voice input unit, at least one display unit for display of a received signal that indicates whether voice signals from one of the radio reception devices are output on the voice output unit, and at least one selection unit for selection of the radio transmission devices and radio reception devices that the workstations use to set up a voice connection on the basis of control signals, by means of a number of radio transmission devices and radio reception devices, wherein the voice signals produced by the voice input units and the operator control signals produced by the operator control units are transferred to the radio transmission devices, and the voice signals delivered by a workstation are forwarded to the radio transmission device and, during simultaneous transmission of an operator control signal by the workstation, are sent by said radio transmission device by means of radio, wherein the radio reception devices receive voice signals by means of radio and these voice signals are forwarded to the workstations and are output using the voice output units, wherein during the reception of voice signals and during the forwarding of voice signals to the workstations a received signal is respectively transmitted to the respective workstation and displayed by the display unit, there is provision that voice data are transmitted from the workstations to the radio transmission devices and radio reception devices via control devices, that the control units, given the simultaneous presence of a multiplicity of operator control signals of multiple workstations, select the voice signals of one of the workstations according to prescribed or prescribable criteria or overlay the voice signals of multiple workstations according to prescribed criteria and transfer the selected voice signal, or voice signal overlaid on the radio transmission device, thus obtained for sending, and that the control units, given the presence of a voice signal transmitted by the radio reception device, transmit to the workstations connected to them a received signal and transfer the voice signals to these workstations. This achieves particularly a simple transfer of data to the radio devices at a deterministic data rate. Furthermore, there is no longer any need for radio devices to arbitrate the voice radio data supplied to it.

Furthermore, the invention relates to a method for transferring voice data from a number of workstations, particularly for air traffic controllers, respectively comprising:

at least one voice input unit, particularly a microphone, at least one voice output unit, particularly a loudspeaker or headphones, at least one operator control unit for producing an operator control signal that indicates that voice signals are intended to be transferred from the respective workstation to one of the radio transmission devices by means of the voice input unit, at least one display unit for display of a received signal that indicates whether voice signals from one of the radio reception devices are output on the voice output unit, and at least one selection unit for selection of the radio transmission devices and radio reception devices that the workstations use to set up a voice connection on the basis of control signals, by means of a number of radio transmission devices and radio reception devices, wherein the voice signals produced by the voice input units and the operator control signals produced by the operator control units are transferred to the radio transmission devices, and the voice signals delivered by a workstation are forwarded to the radio transmission device and, during simultaneous transmission of an operator control signal by the workstation, are sent by said radio transmission device by means of radio, wherein the radio reception devices receive voice signals by means of radio and these voice signals are forwarded to the workstations and are output using the voice output units, wherein during the reception of voice signals and during the forwarding of the voice signals to the workstations a received signal is respectively transmitted to the respective workstation and displayed by the display unit. Said method has provision that a workstation service is respectively carried out for the workstations on computers arranged remotely from the workstations, particularly on a distribution unit, wherein each workstation is assigned at least one workstation service, and that a logical or physical data connection having a prescribed bandwidth is respectively created between the workstation service and the workstation associated with this workstation service, which data connection is used to transfer voice signals from the voice input unit and voice signals to the voice output unit of the workstation and also operator control signals and received signals, that the workstation service confers or overlays the voice signals reaching it from radio reception devices, particularly by means of the control units, according to a rule prescribed on the basis of control signals and transmits the voice signals ascertained therefrom to the workstation or forwards the voice signals arriving from a selected radio reception device, particularly by means of one of the control units, to the workstation and, if there are actually voice signals present, forwards a received signal to the workstation, and the workstation service transmits the voice signals and operator control signals that have been transmitted to it by the workstation to radio transmission devices, particularly by means of one of the control units that have previously been selected by means of control signals. This achieves particularly a simple transfer of voice signals between the workstations and the control units with a deterministic bandwidth.

A further aspect of the invention provides that the selection of the voice signal to be sent or the distribution of a received voice signal is made at a location that, from the point of view of the network, is linked with greater bandwidth to the workstations via a network, so as to be able to simultaneously receive the voice signals from multiple workstations or simultaneously send voice signals to multiple workstations and then also be able to make the decision about the signal to be sent. This means that only one voice signal needs to be transferred to the radio transmission device or only one voice signal needs to be transferred from the radio reception device. This function, which realizes the linking of radio transmission devices and radio reception devices, is referred to as a whole as frequency service and is realized by a control unit.

The introduction of control devices on which frequency services are implemented links the radio devices directly to the frequency service or the control unit, and there is only the transfer of the voice signal selected by the frequency service to one or more radio transmission devices, or the control unit undertakes distribution of the voice signal received by one or more radio reception devices to the workstations. This means that there is also no longer any need for the voice signals to be transferred from and to the radio devices in compressed fashion so as thereby to save bandwidth or to minimize the required bandwidth or to use network mechanisms such as multicasting for the transfer of audio signals between the workstations and the radio devices, the use of which network mechanisms is problematic via wide area networks WAN.

At the same time, it is also possible for multiple radio devices that are located at different radio sites and are operated at the same physical frequency to be combined in a frequency service by a shared control unit, selection of the signal to be transmitted and selection of the radio site being undertaken by the frequency service. The frequency service or the control unit can also undertake further functions and make the functions realized thereby available to all users. These comprise, by way of example:

rating of the receiver signals on simultaneous reception by multiple radio reception devices associated with the frequency service, on the basis of different quality parameters for the received signal, and possibly an additional optional signal selection, dynamic selection of one or more radio transmission devices having one frequency during CLIMAX operation for a radio transmission. This function may also be dependent on a preceding reception, which is referred to as "transmitter follows receiver", changeover to a substitute radio device, main/standby changeovers, in the event of the active radio device being faulty, dynamic delay time compensation for the propagation time of an audio signal between workstation and multiple radio transmission devices having one frequency during CLIMAX operation, etc.

If a communication system contains m workstations and n frequency services, each frequency service in turn being able to combine multiple radio devices, then it is possible for each workstation to transmit on or listen in on any number of frequency services simultaneously. This results in an m:n communication matrix between the workstations and the frequency services or control unit. Which frequency services or control unit a workstation is actually permitted to access is stipulated by the configuration of the workstations, which configuration can be changed according to the operational requirements. The actual use of a frequency service or control unit is dependent on the keying by the user.

BRIEF DESCRIPTION OF THE SEVERAL VIEWS OF THE DRAWING

FIGS. 2-6 illustrate possible realizations of communication systems according to the invention.

FIG. 2 schematically shows the design of a first embodiment of a communication system according to the invention, wherein control units having frequency services are provided. FIG. 3 schematically shows the design of a second communication system according to the invention, wherein distribution units are provided that act as workstation proxy computers. FIG. 4 shows a third embodiment of the invention with a combination of the features depicted in FIGS. 2 and 3. FIG. 5 shows a fourth embodiment of the invention, wherein multiple mutually independent computer centers and superordinate control units are provided. FIG. 6 shows an alternative to the third embodiment of the invention, wherein two control units are coupled to one another.

DESCRIPTION OF THE INVENTION

Between the frequency service and each individual radio transmission device or radio reception device, there is a logical 1:1 communication link, as a result of which the necessary data rate between the frequency service and the radio devices remains limited and deterministic, regardless of how many workstations 11, 12, 13 actually use a frequency or a distribution unit 31, 32, 33. Hence, the necessary data rate between the radio devices and the frequency service is minimized, as a result of which audio compression of the voice signals on this transmission link is not absolutely necessary.

The frequency service implemented in the control unit 31, 32, 33 is used for the setup and monitoring of the audio connections to the radio transmission device and radio reception device allocated to the frequency service, each frequency service managing a prescribed radio frequency.

Figure 1:
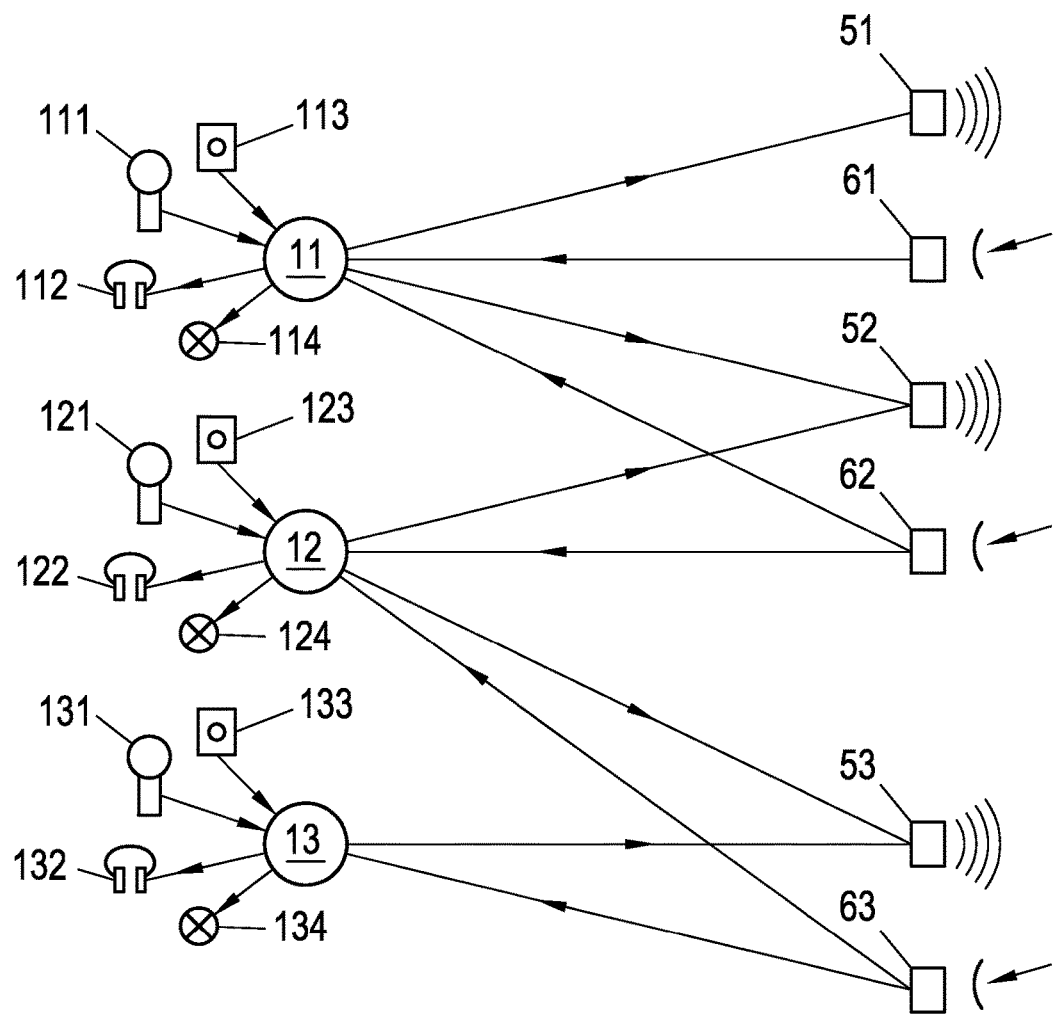
FIG. 1 shows a diagram of a communication system according to the prior art.
Figure 2:
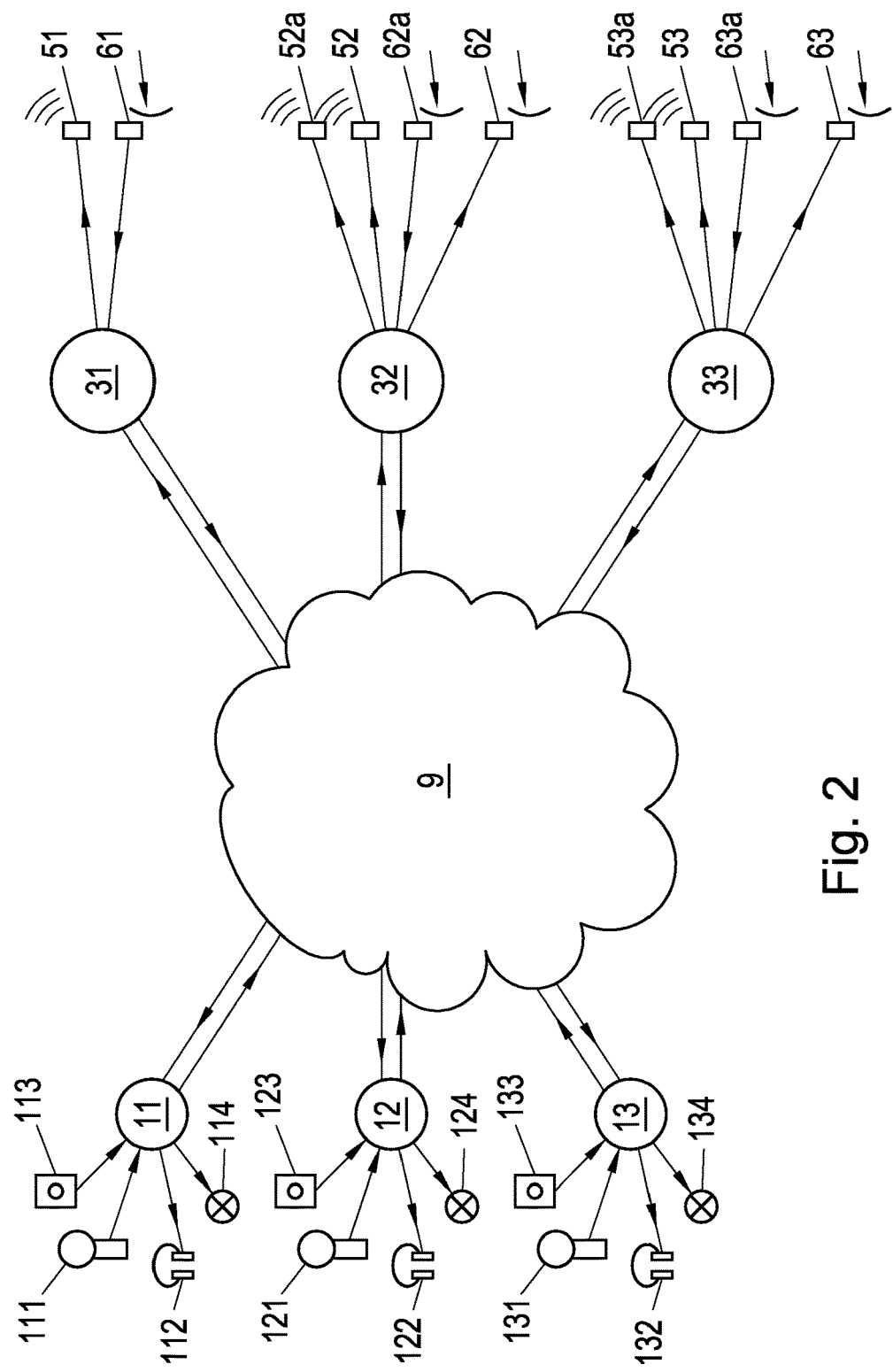

The first embodiment of the invention, depicted in FIG. 2, comprises a number of workstations 11, 12, 13 that are connected to control units 31, 32, 33 via a wide area network. Each of the workstations respectively has at least one voice input unit 111, 121, 131, this being a microphone in the present case. Furthermore, each workstation respectively has at least a voice output unit 112, 122, 132, which are in the form of loudspeakers or headphones in the present case. Furthermore, the individual workstations 11, 12, 13 have an operator control unit 113, 123, 133, these respectively being able to be used to produce and transmit an operator control signal PTT. This operator control signal indicates that the respective workstation 11, 12, 13 is intended to use the voice input unit 111, 121, 131 to transfer voice signals to one of the radio transmission device 51, 52, 53. Furthermore, each of the workstations has a display unit 114, 124, 134 for displaying a received signal SQU. Furthermore, the workstations have a selection unit, not depicted, for selecting that radio transmission device 51, 52, 53 and radio reception device 61, 62, 63 to which the respective workstation wishes to send voice signals or from which the respective workstation 11, 12, 13 wishes to receive voice signals. The control units 31, 32, 33, which are connected to the workstations 11, 12, 13 via the wide area network WAN, are for their part connected to a radio transmission device 51, 52, 52a, 53, 53a and to a radio reception device 61, 62, 62a, 63, 63a. This means that the control units 31, 32, 33 are in the signal path between the workstations 11, 12, 13 and the radio transmission device 51, 52, 53 or the radio reception device 61, 62, 63.

As already known in the prior art, the radio transmission devices 51, 52, 53 are supplied with the voice signals produced by the voice input units 111, 121, 131 and the operator control signals produced by the operator control units 113, 123, 133 indirectly via the control units 31, 32, 33. The radio transmission device 51, 52, 53 is designed for delivery of the voice signals transferred by a workstation 11, 12, 13 during simultaneous transmission of an operator control signal PTT by means of radio. Similarly, the radio reception devices 61, 62, 63 respectively transmit a received signal SQU during the reception of voice signals and during forwarding thereof to the workstations 11, 12, 13. The radio reception devices 61, 62, 63 are designed for reception of voice signals by means of radio, the voice signals received by the radio reception devices 61, 62, 63 being supplied by individual workstations 11, 12, 13 for delivery to the voice output units 112, 122, 132.

As is evident from the present first exemplary embodiment, each control unit 31, 32, 33 has a communication connection to at least one radio transmission device 51, 52, 53 and to at least one radio reception device 61, 62, 63. In this advantageous embodiment of the invention, the radio devices 51, 61 associated with the control unit 31 use the same frequency. Similarly, the radio devices 52, 52a, 62, 62a associated with the second control unit 52 use a shared frequency and the radio devices 53, 53a, 63, 63a associated with the control unit 33 likewise use a shared frequency. The effect achieved by this measure is that the frequency services executed in the control units 31, 32, 33 are respectively used to manage a radio frequency in a particular area. The control units 31, 32, 33 allow simultaneous connection to one or more of the workstations 11, 12, 13 via the wide area network. In particular, all of the workstations 11, 12, 13 may be connected to all control units 31, 32, 33 via the wide area network.

In the first embodiment of the invention depicted in FIG. 2, the control units 31, 32, 33 undertake the task of arbitrating the outgoing voice signals to be transmitted by the workstations and distributing the voice signals arriving from the radio reception devices 61, 62, 62*a*, 63, 63*a* to the workstations. In the event of the simultaneous presence of a number of operator control signals PTT from multiple workstations 11, 12, 13, the control units 31, 32, 33 select the voice signals of one of the workstations 11, 12, 13 according to prescribed or prescribable criteria. Alternatively, there is the option for the voice signals of the individual workstations 11, 12, 13 to be overlaid according to prescribed criteria. The voice signal of this kind, selected or obtained by overlaying, is transmitted to the radio transmission device 51, 52, 53 and beamed by this radio transmission device. To forward the voice signals arriving at the respective radio reception installation 61, 62, 63, the control units transmit the voice signals transmitted to them to the workstations 11, 12, 13 connected to them a received signal SQU and also the voice signals to be received.

In the practical realization, a frequency service and also the additional services described in the later part of the text consist of at least one software component in which the control and communication functions of the frequency service are realized and at least one software component in which the processing and distribution of the audio signals together with the signaling information PTT and SQU are realized. These software components can be executed together in a PC server or in a specific hardware component. However, it is equally possible for the software components to be executed on different PC servers, in different virtual machines or on specific hardware components, or for the software component of the audio transfer and distribution to be operated repeatedly, for example, in order to be able to realize a redundant transfer of the audio signals.

The transfer of voice and signaling information is increasingly realized using data distribution networks specific to air traffic control, as a result of which the air traffic controller workstations can be physically separated from the frequency services connected to the radio devices over longer distances. Transfer of the voice and signaling information between the workstations 11, 12, 13 and the control units 31, 32, 33 is effected via wide area networks WAN, and the individual radio devices are frequently connected to the control unit via lines with low bandwidth.

The first embodiment of the invention allows voice signals to be transferred in a manner free from blockage. If, in a first embodiment of the invention, a workstation 11, 12, 13 wants to send voice signals to multiple frequency services or control units 31, 32, 33, the same voice signal is transferred to each frequency service that has been selected by this workstation 11, 12, 13. Overall, this means that the same voice signal is transferred repeatedly in the data network. If, on the other hand, a frequency service is listened in on by multiple workstations 11, 12, 13, then said frequency service the same voice signal is transmitted to each workstation 11, 12, 13. This means that this voice signal is likewise transferred repeatedly in the network.

Figure 3:
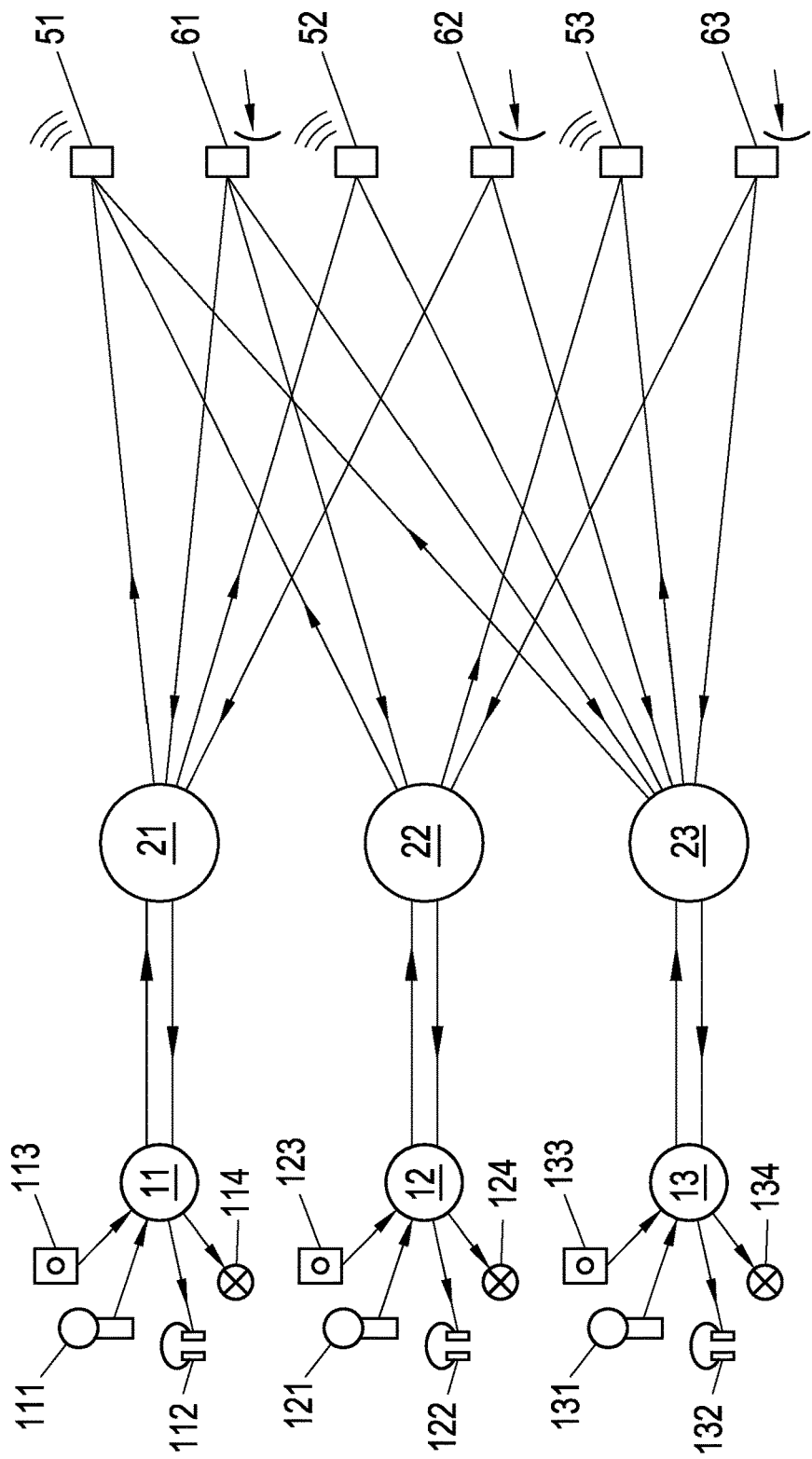

FIG. 3 depicts a second embodiment of the invention in more detail. This embodiment shows a communication system for voice communication by means of a number of workstations 11, 12, 13 for air traffic controllers. The communication system comprises a number of radio transmission devices 51, 52, 53 and radio reception devices 61, 62, 63. As in the case of the first exemplary embodiment of the invention too, each of the workstations 11, 12, 13 respectively has at least the following:

- at least one voice input unit 111, 121, 131, particularly a microphone,
- at least one voice output unit 112, 122, 132, particularly a loudspeaker,
- at least one operator control unit 113, 123, 133 for producing an operator control signal PTT that indicates that voice signals are intended to be transferred from the respective workstation 11, 12, 13 to one of the radio transmission devices 51, 52, 53 by means of the voice input unit 111, 121, 131,
- at least one display unit 114, 124, 134 for display of a received signal SQU that indicates whether voice signals from one of the radio reception devices 61, 62, 63 are output on the voice output unit 112, 122, 132, and
- at least one selection unit for selection of the radio transmission devices 51, 52, 53 and radio reception devices 61, 62, 63 that the workstations use to set up a voice connection on the basis of control signals.

The workstations 11, 12, 13 transmit the voice signals produced by the voice input units 111, 121, 131 and the operator control signals PTT produced by the operator control units 113, 123, 133 to the distribution units 21, 22, 23, which forward the voice signals to the radio transmission devices 51, 52, 53. The latter deliver the voice signals transferred by a workstation 11, 12, 13 during simultaneous transmission of an operator control signal PTT. The radio reception devices 61, 62, 63 receive voice signals by means of radio. The voice signals received by the radio reception devices 61, 62, 63 are supplied to the individual distribution units 21, 22, 23, which forward the voice signals to the workstations 11, 12, 13. The voice signals are delivered to the respective voice output units 112, 122, 132 by the workstations 11, 12, 13. The radio reception devices 61, 62, 63 respectively transmit a received signal SQU to the workstations 11, 12, 13 via the distribution units 21, 22, 23 during the reception of voice signals and forwarding thereof.

The communication system additionally has a number of distribution units 21, 22, 23 that are respectively associated with a workstation 11, 12, 13, each workstation 11, 12, 13 having at least one, in the present case precisely one, associated distribution unit 21, 22, 23. Between each of the distribution units 21, 22, 23 and the workstation 11, 12, 13 associated with this distribution unit 21, 22, 23 there is respectively a logical or physical data connection having a prescribed bandwidth, which can be used to transfer voice signals from each voice input unit 111, 121, 131 and voice signals to each voice output unit 112, 122, 132 of the workstation 11, 12, 13 and also operator control signals PTT and received signals SQU.

The distribution unit 21, 22, 23 confers or overlays the voice signals reaching it from radio reception devices 61, 62, 63 according to a rule prescribed on the basis of control signals. The voice signals ascertained therefrom are transmitted by said distribution unit to the workstation 11, 12, 13. If there are actually voice signals present, the distribution unit forwards a received signal SQU to the workstation 11, 12, 13. The respective distribution unit 21, 22, 23 transmits its voice signals transmitted by the workstation 11, 12, 13 to radio transmission devices 51, 52, 53 previously selected by means of control signals.

In the second embodiment of the invention, the required bandwidth or data rate for the transfer of the voice signals from the workstations to the distribution units is constant and independent of the number of frequencies or radio devices talked on and listened in on.

Figure 4:
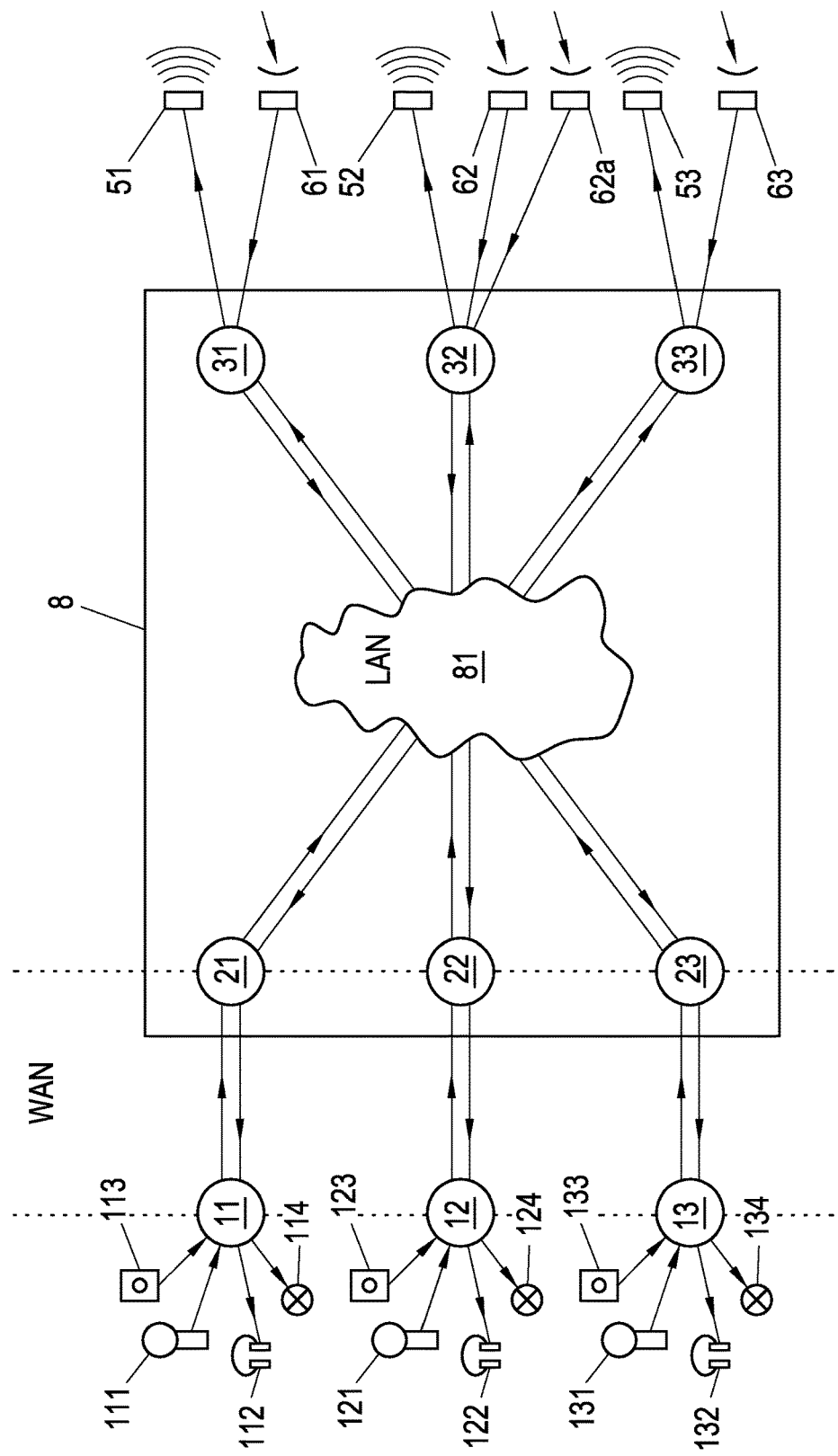

The third embodiment of the invention, described below and depicted in FIG. 4, is intended to avoid the disadvantages of inefficient utilization of the bandwidth available in the network and the disadvantage of a nondeterministic bandwidth requirement for the individual components. The third embodiment of the invention is depicted on the basis of the first embodiment of the invention and essentially has the features of the first two embodiments of the invention.

Identical voice signals are now intended to be transferred via the network only once, resulting in more efficient utilization of the available bandwidth and avoiding unnecessary overdimensioning of the network.

From the point of view of the individual components workstations 11, 12, 13 and control unit 31, 32, 33, the bandwidth requirement therefor when accessing the network is limited at the top and, for each workstation 11, 12, 13, independent of the number of control units 31, 32, 33 that a workstation 11, 12, 13 simultaneously uses, listens in on and/or talks on, or, for each control unit 31, 32, 33, independent of the number of workstations that simultaneously listen in on it.

In addition to the communication structure depicted in FIG. 2, the system architecture is improved by also introducing, for each workstation 11, 12, 13, an additional workstation service that is implemented in a distribution unit 21, 22, 23.

This results in a structure in which the workstations 11, 12, 13 can be arranged remotely from the control units 31, 32, 33 over any distances via a wide area network WAN.

The workstation service executed on the distribution unit 21, 22, 23 realizes all radio functions of a workstation 11, 12, 13 and allows displaced linking of the operator control units and the audio input/output units. It firstly transfers the voice signals of a workstation 11, 12, 13 to all control units 31, 32, 33 or frequency services used and, secondly, it receives all voice signals form the control units 31, 32, 33 or frequency services and forwards them to the workstation 11, 12, 13, these voice signals being conferred in accordance with their allocation to audio output units of the workstation 11, 12, 13, such as e.g. headphones, loudspeakers, . . . .

In this case, it is possible for the possible m:n communication links between the workstation services in the distribution unit 21, 22, 23 and the frequency services in the control units 31, 32, 33 to be realized in the local area network 81 of a computer center 8. In comparison with a wide area network, FIG. 2, the bandwidth requirement in a local area network 81 plays a subordinate part in the costs and in the dimensioning of the network components. Similarly, it is possible for different distribution mechanisms, e.g. multicast groups, to be realized more easily in a local area network 81.

Each workstation 11, 12, 13 is therefore respectively linked via a wide area network to a workstation service or a distribution unit 21, 22, 23, as a result of which the bandwidth necessary therefor is low and deterministic, no signals need to be transferred repeatedly and no additional voice signals need to be transferred during operation even in the event of a change in the frequency services used by the workstation 11, 12, 13. Between the workstation and the workstation service or the distribution unit 21, 22, 23, there therefore exists a strict logical 1:1 communication link, as a result of which the data rate necessary per workstation 11, 12, 13 in the wide area network is minimized, deterministic and also limited.

The frequency service implemented in the control unit 31, 32, 33 is used for the setup and monitoring of the audio connections to the radio transmission device and radio reception device allocated to the frequency service operation with overlapping chains or CLIMAX operation, each frequency service managing a prescribed radio frequency.

Between the frequency service and the radio transmitters and radio receivers, there is a logical 1:1 communication link, as a result of which the necessary bandwidth between the frequency service and the radio devices remains limited and deterministic regardless of how many workstations 11, 12, 13 actually use a frequency or a distribution unit 31, 32, 33. Hence, the necessary bandwidth between the radio devices and the frequency service is minimized, as a result of which audio compression of the voice signals for bandwidth minimization on this transmission link is not absolutely necessary.

So that a frequency service or a control unit 31, 32, 33 has multiple associated radio reception devices 61, 62, 63 and any user can select a specific location or, in the event of operation with best signal selection, the selection of the frequency service can be individually overruled by any user, the voice signals of all radio reception devices 62a, 62 of a control unit 31, 32, 33 are transferred to the distribution unit 21, 22, 23, so as to be able to perform the applicable selection there. The quality of the received signals is rated in the control unit 31, 32, 33, this information is transferred to the respective distribution units 21, 22, 23, and the actual selection of the voice signal to be sent to the workstation is first made by the workstation service in the distribution unit. This means that it is possible to realize standard rating and ranking of the received voice signals across the system and still to provide every operator with the opportunity to be able to make an individual selection from the voice signals of each frequency service.

Figure 5:
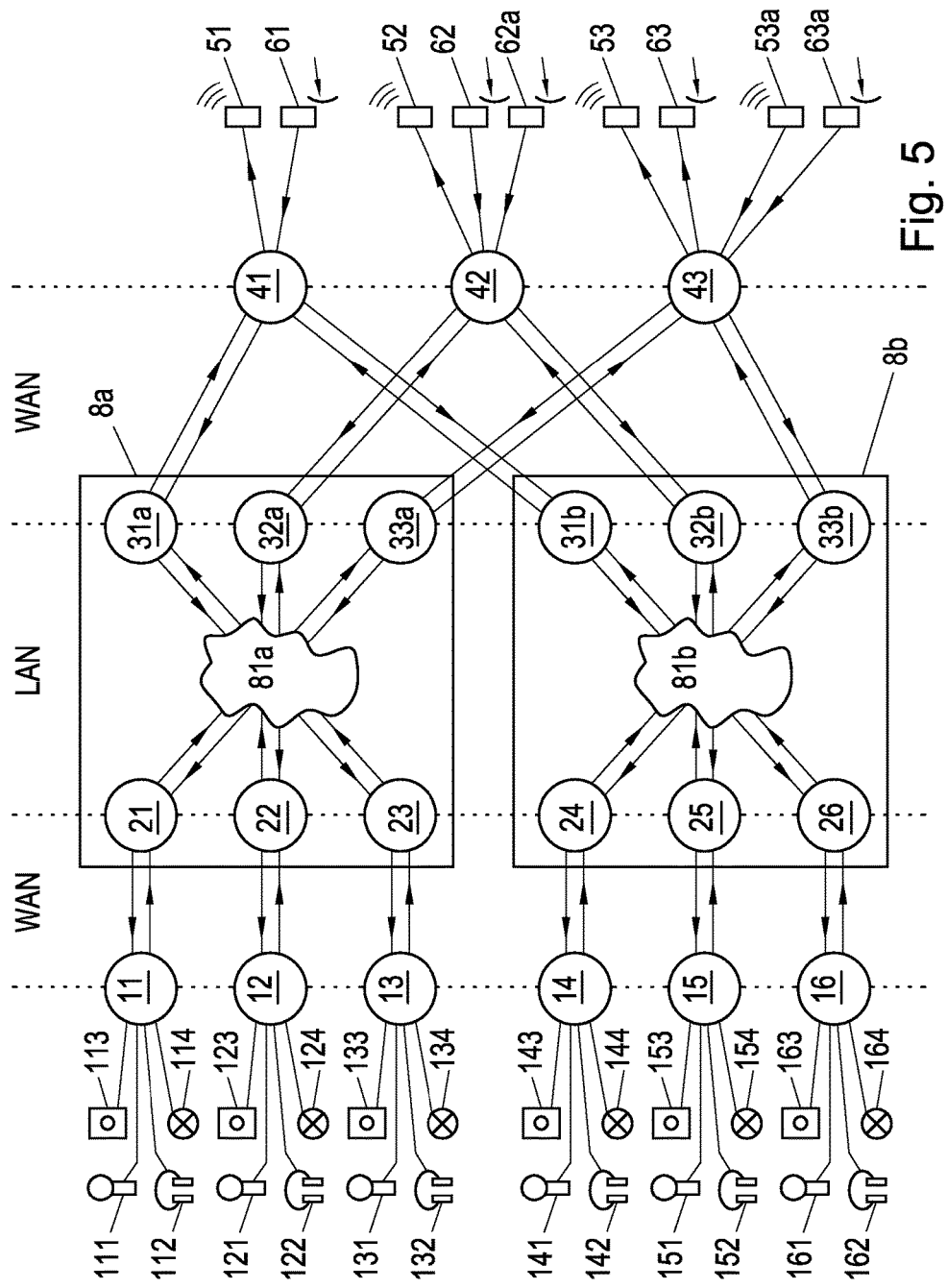

In a fourth embodiment of the invention, multiple radio communication systems can be interconnected to form virtual centers. FIG. 5 shows an example of the communication structures of such a communication system, in the individual computer centers 8a, 8b being connected to the radio devices via superordinate control units 41, 42, 43.

The individual control units 31a-33a, 31b-33b arranged in the computer centers 8a, 8b have a reduced scope of functions in comparison with the frequency services of the previous embodiment of the invention. They arbitrate the voice signals from the workstation services of a computer center 8a, 8b for a superordinate control unit 41, 42, 43 in the transmission direction and, secondly, distributes the voice signals of the control unit to the workstation services of the distribution unit 21, 22, 23 of a computer center 8a, 8b in the reception direction, e.g. for all users who want to listen in on this frequency.

For each frequency, there is precisely one control unit 31a-33a, 31b-33b available in a computer center. A superordinate control unit 41, 42, 43, which can be operated at a different geographical location than a computer center, controls the control units 31a-33a, 31b-33b of different computer centers 8a, 8b, as a result of which no voice signals are transferred repeatedly on the connection between a control unit 31a-33a, 31b-33b and a superordinate control unit and hence the required bandwidth via the WAN is static and deterministic. Additionally, an active connection between a control unit 31a-33a, 31b-33b and a superordinate control unit 41, 42, 43 in a computer center 8a, 8b is necessary only when at least one workstation 11, 12, 13 in this computer center 8a, 8b has keyed in this frequency.

To realize a virtual control center, it is not absolutely necessary for the workstations 11-16 to be always connected to the same computer center 8a, 8b. For example, it is possible to realize structures that allow the following operating conditions:

In the event of failure of a computer center 8a, 8b, workstations 11-16 and superordinate control units 41, 42, 43 are connected to a backup computer center in order to maintain operation.

At small airports, it may make sense for operation during the night hours to be intended to be undertaken by other workstations in a larger workstation control center, for example.

At very small airports, it may make sense for the computer centers not to be designed to have the distribution units, and to have the workstations 11-16 communicate directly with the superordinate control units 41, 42, 43, for example.

In the first, third and fourth embodiments of the invention, there is the option of realizing coupling between two or more frequencies. By way of example, the third embodiment of the invention in FIG. 6 is used to depict an extension that involves frequencies being coupled to one another. For this purpose, additional coupling services 7 are realized in the computer center 8. When an operator wishes to couple two or more frequencies respectively managed by control units 31, 32, 33 to one another, this coupling is assigned to a coupling service 7, which forwards the signals that are received from a frequency service or a control unit 31, 32, 33 to the other selected control units—the term coupling group is also used—in order to transmit the signal on all selected frequencies. The advantage of this solution is that, in contrast to coupling directly at the workstation, the delay times in the coupling loop are reduced, since the voice signals do not have to be transferred twice via the wide area network.

A further advantage of this solution is the central management of a coupling group, as a result of which it is possible for couplings of the same frequencies by multiple users to be regulated once centrally in the coupling service 7 rather than in a manner distributed in the workstations 11, 12, 13 and control units that are involved. This allows runtime effects and reciprocal blockage to be avoided.

The invention claimed is:

1. A method for transferring voice data from a plurality of workstations by way of a plurality of radio transmission devices and radio reception devices,
   workstations respectively comprising:
      at least one voice input unit, at least one voice output unit, at least one operator control unit for producing an operator control signal that indicates that voice signals are intended to be transmitted from the respective workstation to one of the radio transmission device by way of the voice input unit;
      at least one display unit for display of a received signal that indicates whether voice signals from one of the radio reception devices are output on the voice output unit; and
      at least one selection unit for selection of the radio transmission devices and the radio reception devices that the workstations use to set up a voice connection on the basis of control signals;
   the method comprising:
   transferring the voice signals produced by the voice input units and the operator control signals produced by the operator control units to the radio transmission devices, and forwarding the voice signals delivered by a workstation to the radio transmission device and, sending, during simultaneous transmission of an operator control signal by the workstation, by the radio transmission device by way of radio;
   receiving by the radio reception devices voice signals by radio and forwarding the voice signals to the workstations and outputting the voice signals using the voice output units, wherein during the reception of voice signals and during the forwarding of voice signals to the workstations a received signal is respectively transmitted to the respective workstation and displayed by the display unit;
   carrying out a workstation service respectively for the workstations on computers arranged remotely from the workstations, wherein each workstation is assigned at least one workstation service;
   establishing a logical or physical data connection having a prescribed bandwidth respectively between the workstation service and the workstation associated with the workstation service, and using the data connection to transfer voice signals from the voice input unit and voice signals to the voice output unit of the workstation and also operator control signals and received signals;
   conferring or overlaying the voice signals reaching the workstation service from radio reception devices according to a rule prescribed on the basis of control signals and transmitting the voice signals ascertained therefrom to the workstation or forwarding the voice signals arriving from a selected radio reception device to the workstation and, if there are voice signals actually present, forwarding a received signal to the workstation; and
   transmitting with the workstation service the voice signals and operator control signals that have been transmitted to the workstation to radio transmission devices that have previously been selected by way of the control signals.

2. The method according to claim 1, wherein:
   a plurality of control units are arranged in a signal path between the distribution units and the radio transmission devices and between the workstations and the radio reception devices, wherein each control unit is assigned at least one radio transmission device and at least one radio reception device;
   multiple distribution units are connected to the same control unit;
   the control units, given a simultaneous presence of a multiplicity of operator control signals at multiple distribution units, select the voice signals of one of the distribution units according to prescribed or prescribable criteria and transfer the voice signals to the radio transmission device for sending; and
   the control units, given a presence of a voice signal transmitted by the radio reception device, transmit a received signal to the distribution units connected to the radio reception device and transfer the voice signals to these distribution units.

3. The method according to claim 2, wherein:
   a plurality of control units are arranged in a signal path between the workstation services and the radio transmission devices and between the workstation services and the radio reception devices, wherein each control unit has a communicative connection set up for it to at least one radio transmission device and at least one radio reception device;
   wherein the radio transmission devices and radio reception devices associated with the same control unit use the same radio frequency, and wherein each radio transmission device and radio reception device is assigned only to a single control unit; and multiple workstations are connected to the same control unit.

4. The method according to claim 2, wherein:
at least one control unit is connected to a plurality of radio transmission devices;
the control unit transmits the voice signals arriving from a distribution unit only to one of the radio transmission devices or to all radio transmission devices having a connection to the control unit for transfer; and
the control unit transmits the voice signals arriving at it from the radio reception devices to the distribution units having a voice connection to the control unitt.

5. The method according to claim 2, wherein:
the control unit is connected to at least one radio transmission device and at least one backup radio transmission device and the control unit transfers the voice signals to the radio transmission device when the latter is functioning and otherwise transfers the voice signals to the backup radio transmission device; and/or
the control unit is connected to at least one backup radio reception device and the control unit distributes the voice signals from the radio reception device to the distribution units when the radio reception device connected to the control unit is functioning and otherwise distributes the voice signals from the backup radio reception device to the distribution units.

6. The method according to claim 2, wherein:
the signal path between a control unit and the radio transmission device contains at least one superordinate control unit connected to a plurality control units (31a-33a, 31b-33b), wherein particularly each of these control units (31a-33a, 31b-33b) is connected to groups of workstations;
the voice signals and operator control signals delivered by the control units (31a-33a, 31b-33b) are transferred to the superordinate control unit, wherein the superordinate control unit, given simultaneous delivery of operator control signals of multiple control units (31a-33a, 31b-33b) connected to it, selects one of the control units (31a-33a, 31b-33b) according to prescribed or prescribable criteria and forwards the voice signals of the selected control unit to the radio transmission device; and
the superordinate control unit, on reception of voice signals from the radio reception device, forwards these voice signals to the control units (31a-33a, 31b-33b) connected to the superordinate control unit and transfers a received signal to these control units (31a-33a, 31b-33b).

7. The method according to claim 6, which comprises using the control units or the superordinate control units to transmit the voice signals arriving at them and the respectively associated received signal merely to a selection of workstation services, distribution units or control units.

8. The method according to claim 7, which comprises defining the selection by the control units or the superordinate control units on a basis of previously made demands by the workstations or the control units.

9. The method according to claim 6, wherein the control units or superordinate control units directly connected to the radio reception devices are respectively connected to a plurality of radio reception devices and rate the voice signals arriving at them from the radio reception devices and produce a rating signals, the rating signals indicating:
  a) a ranking of the arriving voice signals according to signal quality or
  b) the best of the arriving voice signals;

the control units or superordinate control units directly connected to the radio reception devices forwarding the rating signal and also the individual voice signals of all radio reception devices to the distribution unit or the control units.

10. The method according to claim 9, which comprises transmitting with the control unit the rating signal to the distribution unit, and the distribution unit taking the rating signal as a basis for selecting one of the voice signals transmitted by the respective control unit or taking the rating signal as a basis for overlaying multiple instances of the voice signals transmitted by the respective control unit on one another and transmitting the selected or overlaid signal to the respective workstation.

11. The method according to claim 2, which comprises:
prescribing a coupling group that comprises two or more control units and/or superordinate control units; and
on arrival of voice signals and of a received signal from a control unit or superordinate control unit of the coupling group, transmitting these voice signals and an operator control signal to the other control units and/or superordinate control units of the coupling group.

12. The method according to claim 11, which comprises, on simultaneous arrival of voice signals from two control units or superordinate control units of the coupling group, selecting one of the control units or superordinate control units according to prescribed or prescribable criteria and forwarding only the voice signals of the selected control unit or superordinate control unit to the remaining control units or superordinate control units of the coupling group.

13. The method according to claim 11, which comprises:
prescribing criteria for the forwarding of data of individual control units or superordinate control units to other control units or superordinate control units of the coupling group; and
on arrival of voice signals from a control unit or superordinate control unit of the said coupling group, transferring voice data to the control units or superordinate control units of the coupling group according to the prescribed criteria.

14. The method according to claim 1, which comprises executing the workstation services on proxy computers and using control units to communicate with one another.

15. The method according to claim 14, which comprises executing the workstation services on distribution units in a computer center and using control units that are likewise arranged in the computer center to exchange voice signals via a local area network.

16. The method according to claim 1, wherein a workstation has multiple voice input units and/or multiple voice output units and the method comprises:
transferring with each voice input unit voice signals to the respective workstation service via a separate data connection; and
transferring voice signals to each voice output unit by the respective workstation service via a separate data connection.

17. A communication system for voice communication, the system comprising:
a plurality of radio transmission devices and radio reception devices;
a plurality of workstations, each of said workstations including:
at least one voice input unit;
at least one voice output unit;
at least one operator control unit for producing an operator control signal that indicates that voice signals are intended to be transferred from the respective said workstation to one of said radio transmission devices by way of a voice input unit;

at least one display unit for displaying a received signal that indicates whether voice signals from one of the radio reception devices are output on the voice output unit;

at least one selection unit for selection of said radio transmission devices and radio reception devices that are used by said workstations to set up a voice connection on the basis of control signals;

wherein said radio transmission devices are supplied with the voice signals produced by said voice input units and the operator control signals produced by said operator control units, and said radio transmission devices are configured for delivery of the voice signals transferred by a respective said workstation during a simultaneous radio transmission of an operator control signal;

wherein said radio reception devices are configured for receiving voice signals by way of radio, the voice signals received by said radio reception devices are supplied to the individual said workstations for delivery by said voice output units, and said radio reception devices respectively transmit a received signal to said workstations during a reception and forwarding of the voice signals;

a plurality of control units disposed in a signal path between said workstations and said radio transmission devices and between said workstations and said radio reception devices, each said control unit having a communicative connection to, and being associated with, at least one said radio transmission device and at least one said radio reception device;

wherein multiple said workstations are connected to one and the same said control unit;

said control units, given a simultaneous presence of a multiplicity of operator control signals of multiple distribution units, selecting the voice signals of one of said distribution units according to prescribed or prescribable criteria or overlay the voice signals of multiple workstations according to prescribed criteria and transferring the selected or overlaid voice signal thus obtained for sending to said radio transmission device; and said control units, given a presence of a voice signal transmitted by said radio reception device, transmitting a received signal to said workstations connected thereto and transferring said voice signals to said workstations; and a coupling unit connected to two or more said control units and/or superordinate control units, said coupling unit, on arrival of voice signals and of a received signal from a control unit or superordinate control unit connected thereto, forwarding the voice signals and also an operator control signal to other control units and/or superordinate control units connected thereto.

18. The communication system according to claim 17, wherein said coupling unit, on simultaneous arrival of voice signals from two control units or superordinate control units connected thereto, selects one of said control units or superordinate control units according to prescribed or prescribable criteria and forwards only the voice signals of the selected said control unit or superordinate control unit to the remaining control units or superordinate control units connected to said coupling unit.

19. The communication system according to claim 17, wherein:
said coupling unit is configured to store criteria for the forwarding of data of individual control units or superordinate control units to other control units or superordinate control units; and
said coupling unit is configured to transfer the voice signals arriving at said coupling unit to said control units or superordinate control units connected thereto according to the criteria.

20. The communication system according to claim 17, further comprising a plurality of distribution units that are respectively associated with a workstation, wherein each workstation has at least one associated distribution unit, and wherein:
between each of said distribution units and said workstation associated with said distribution unit there is respectively a logical or physical data connection having a prescribed bandwidth that can be used to transfer voice signals from each voice input unit and voice signals to each voice output unit of said workstation and also operator control signals and received signals;
said distribution unit confers or overlays the voice signals reaching it from radio reception devices according to a rule prescribed on the basis of control signals and transmits the voice signals ascertained therefrom to the workstation or forwards the voice signals arriving from a selected radio reception device to the workstation and, if there are actually voice signals present, forwards a received signal to the workstation; and
said distribution unit transmits voice signals and operator control signals transmitted to it by the workstation to radio transmission devices previously selected by way of control signals.

* * * * *